(12) United States Patent
Sola et al.

(10) Patent No.: US 11,813,564 B2
(45) Date of Patent: Nov. 14, 2023

(54) GAS TREATMENT SYSTEM AND METHOD

(71) Applicants: Serge Sola, Ingleburn (AU); David Decorte, Ingleburn (AU)

(72) Inventors: Serge Sola, Ingleburn (AU); David Decorte, Ingleburn (AU)

(*) Notice: Subject to any disclaimer, the term of this patent is extended or adjusted under 35 U.S.C. 154(b) by 11 days.

(21) Appl. No.: 17/619,595

(22) PCT Filed: Jun. 16, 2020

(86) PCT No.: PCT/AU2020/050605
§ 371 (c)(1),
(2) Date: Dec. 16, 2021

(87) PCT Pub. No.: WO2020/252521
PCT Pub. Date: Dec. 24, 2020

(65) Prior Publication Data
US 2022/0297054 A1  Sep. 22, 2022

(30) Foreign Application Priority Data
Jun. 17, 2019 (AU) .............................. 2019902089

(51) Int. Cl.
*B01F 23/21* (2022.01)
*B01D 53/18* (2006.01)
(Continued)

(52) U.S. Cl.
CPC ........ *B01D 53/18* (2013.01); *B01F 23/21322* (2022.01); *B01F 25/4231* (2022.01);
(Continued)

(58) Field of Classification Search
CPC .................. B01F 23/2132; B01F 23/21322
See application file for complete search history.

(56) References Cited

U.S. PATENT DOCUMENTS

| | | |
|---|---|---|
| RE24,291 E | 3/1957 | Goodyear |
| 3,243,014 A | 3/1966 | Bjorklund |
| (Continued) | | |

FOREIGN PATENT DOCUMENTS

| | | |
|---|---|---|
| CN | 206009097 U | 3/2017 |
| CN | 207325136 U | 5/2018 |
| (Continued) | | |

OTHER PUBLICATIONS

International Written Opinion for PCT/AU2020/050605.
(Continued)

*Primary Examiner* — Robert A Hopkins
(74) *Attorney, Agent, or Firm* — Thomas M. Joseph, Esq.

(57) ABSTRACT

An embodiment gas treatment system (10) includes a gas treatment chamber (12). The gas treatment chamber (12) is separated into (i) a chemical agent chamber (14) adapted to store a liquid chemical agent and (ii) a gas/chemical agent mixing chamber (18) in fluid communication with the chemical agent chamber (14). The system (10) includes an atomising assembly (20) operatively associated with the gas/chemical agent mixing chamber (18) and a pressurised gas supply assembly (22) in operative fluid communication with the atomising assembly (20). The system also includes a chemical agent supply assembly (24) to provide fluid communication between the chemical agent chamber (14) and the atomising assembly (20) wherein the atomising assembly (20) is operatively adapted to atomise liquid chemical agent into a stream of pressurised gas fed from the pressurised gas supply assembly (22) into the gas/chemical mixing agent chamber (18).

18 Claims, 1 Drawing Sheet

Figure 1:
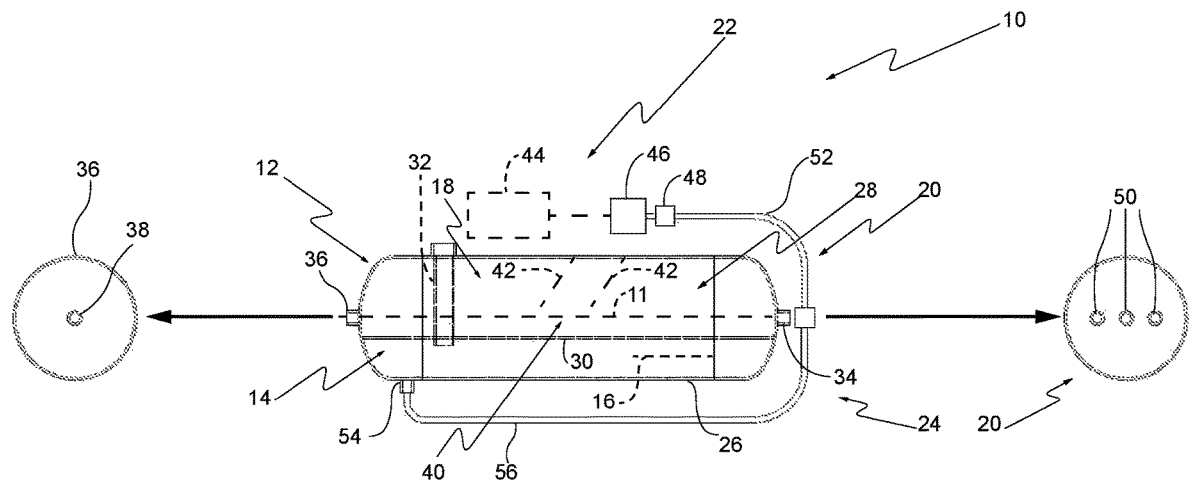

(51) Int. Cl.
  *B01F 25/421* (2022.01)
  *B05B 7/04* (2006.01)
  *B05B 7/24* (2006.01)
  *B05B 7/26* (2006.01)
  *B05D 1/02* (2006.01)
  *B01F 23/213* (2022.01)
  *B01F 101/00* (2022.01)

(52) U.S. Cl.
  CPC .............. *B05B 7/04* (2013.01); *B05B 7/2424* (2013.01); *B05B 7/267* (2013.01); *B05D 1/02* (2013.01); *B01D 2257/708* (2013.01); *B01D 2258/06* (2013.01); *B01F 2101/2305* (2022.01)

(56) References Cited

U.S. PATENT DOCUMENTS

| | | | | |
|---|---|---|---|---|
| 5,385,304 | A | * | 1/1995 | Haruch ...................... B05B 7/08 239/431 |
| 6,098,897 | A | | 8/2000 | Lockwood |
| 9,162,004 | B1 | | 10/2015 | Ansley et al. |
| 11,369,813 | B2 | * | 6/2022 | Hansen .................... A62B 9/02 |
| 2007/0062444 | A1 | | 3/2007 | Shutic et al. |
| 2015/0297775 | A1 | | 10/2015 | Ansley et al. |
| 2018/0092762 | A1 | | 4/2018 | Taylor et al. |

FOREIGN PATENT DOCUMENTS

| | | | | |
|---|---|---|---|---|
| CN | 108525966 | A | | 9/2018 |
| EP | 3134137 | B1 | | 3/2017 |
| JP | 2004351267 | A | * | 12/2004 ........... B05B 7/0012 |
| WO | 88/01195 | A1 | | 2/1988 |

OTHER PUBLICATIONS

Extended European search report which issued on European patent application No. 20825825.5.

Office action with issued on Chinese patent application No. 202080053535.9.

* cited by examiner

GAS TREATMENT SYSTEM AND METHOD

CROSS REFERENCE TO RELATED APPLICATIONS

The present application is a U.S. national stage application of PCT International Application No. PCT/AU2020/050605, filed Jun. 16, 2020, and published as PCT Publication WO/2020/252521 on Dec. 24, 2020, which claims priority to Australian Application No. AU 2019902089, filed on Jun. 17, 2019. The disclosures of all the foregoing applications are hereby incorporated by reference in their entirety into the present application.

FIELD

The present invention relates to a gas treatment system and a gas treatment method. In one particular, but non-exclusive aspect, the invention concerns an air treatment system and an air treatment method for use during a process of applying a coating to a surface with the use of pressurised air.

BACKGROUND

The automotive smash repair industry globally employs millions of people, and annually generates billions of dollars. Automotive collisions are inevitable, and damaged vehicles will require repair. Often such repair must be completed within very tight deadlines.

One essential element of any automotive smash repair activity is the application of a final decorative coat. Over time, advancements in coating technology have resulted in ever superior films being applied to vehicles. Present day coatings represent a myriad of chemical classes that rely on synthetic organic oligomers being polymerised or cross-linked to form inert plastic substrates displaying the desired gloss, adhesion and chemical resistance required by automotive manufacturers. The time required to achieve the liquid to solid phase transition of such coatings has not only presented paint formulators which severe difficulties but has been generally problematic due to the interaction of the many variables which require management. On the one hand it is desirous that the coating stay liquid for as long as possible to allow a broad application window. On the other hand, once a coating has been applied, the phase change must occur as rapidly as possible so that the painted article can dry and undergo further processing. Such further processing may include activities such as sanding, masking, re-coating and subsequent assembly stages.

This necessary phase transition of the coating was in the past brought about by evaporating the solvent, so that the solute was left behind as a dried film. Early resins used as a final decorative coat suffered from the drawback of requiring further processing to ensure an aesthetically appealing finish was obtained and were not easily affected when contacting aggressive environments. Early forms of cross-linkable resins employed oxidation as a drying mechanism. Although cross-linkable resins were an improvement over known resins, they were typically required to be baked at elevated temperatures to reduce waiting times. Higher temperatures, however, were often responsible for the demise and malfunctioning of heat sensitive componentry and plastics. The remedy required that heat sensitive components and plastics were required to be removed prior to painting, with the resulting increase in labour costs and time wastage.

The increased use of plastic components in vehicle manufacture saw the advent of higher molecular weight cross-linkable prepolymers. Such polymers only required moderate baking cycles to effect cure. The evaporative component intrinsic in such hybrid systems, meant that application solids were low, thus necessitating multiple coats to achieve acceptable film builds which displayed the required chip and corrosion resistance. Those systems were also responsible for generating unwanted high volatile organic compounds (VOCs). An alternative was lower molecular weight polymers giving higher crosslink densities and higher applied solids. Such formulations, however, were either (i) required to be catalysed internally to give acceptable dry times (which in turn reduced their usable application window), or (ii) required to be low baked followed by a prolonged further cooling/curing cycle to render them commercially useful.

Recent technological advances have seen the adoption of chemistry not previously thought applicable to the smash repair industry. Both infrared and ultraviolet curing which have been used extensively for many years in the graphic arts industry, have recently been employed in the automotive smash repair sector. The chemistry in these curing systems features high solids low viscosity monomers containing photo initiators. Such photo initiators undergo rapid free radical polymerisation when bombarded by the appropriate type of UV light sources. Advances in light emitting diode (LED) manufacture have made those systems more energy efficient than was previously the case. LED curing systems, however, are still hampered by restrictions in film builds and pigment type. LED curing systems are also focal plane reliant in order to ensure optimum performance. This is particularly problematic on curved surfaces such as those encountered in automotive body panels.

In summary, an optimal coating is ideally one capable of being rapidly crosslinked from a state of a high solids low viscosity liquid containing low molecular weight components, to a continuous dried and inert plastic film when applied to a substrate. These reactions are thermodynamically driven and are temperature dependant. High temperatures mean high costs and may affect sensitive automotive componentry. This scenario does not present a desirable solution to the industry in its current form.

It is well known that thermodynamics can be affected or influenced by the presence of catalytic moieties which, by definition, can either accelerate or decelerate a chemical reaction. They also have the effect of allowing certain reactions to proceed at lower temperatures or lowering the threshold temperature for the initiation of certain reactions. In the case of coatings, the presence of catalysts can make the crosslinking reaction proceed at alarming rates. Accordingly, the direct addition of catalysts to a formulation may render them commercially unusable as the liquid to solid transition time does not allow a suitable application window once the primary components are mixed.

Object

It is an object of the present invention to provide a gas treatment system and a gas treatment method for use during the process of depositing a coating onto a surface with the use of pressurised air in order to dry the deposited coating.

SUMMARY

In a first aspect there is disclosed herein a gas treatment system, the gas treatment system including:

a gas treatment chamber, the gas treatment chamber separated into (i) a chemical agent chamber adapted to store a liquid chemical agent, and (ii) a gas/chemical agent mixing chamber in fluid communication with the chemical agent chamber;
- an atomising assembly operatively associated with the gas/chemical agent mixing chamber;
- a pressurised gas supply assembly in operative fluid communication with the atomising assembly; and
- a chemical agent supply assembly to provide fluid communication between the chemical agent chamber and the atomising assembly,
- wherein the atomising assembly is operatively adapted to atomise liquid chemical agent into a stream of pressurised gas fed from the pressurised gas supply assembly into the gas/chemical mixing agent chamber.

Preferably the gas is air.

Preferably the gas treatment chamber comprises a cylinder having a hollow interior.

Preferably the cylinder houses a separator adapted to separate the hollow interior into the chemical agent chamber and the gas/chemical agent mixing chamber.

Preferably the gas treatment chamber includes a filler assembly through which liquid chemical agent is fed to the chemical agent chamber.

Preferably the gas treatment chamber includes a chamber inlet operatively associated with the atomising assembly, in use pressurised gas from the pressurised gas supply assembly and liquid chemical agent from the chemical agent chamber are fed into the gas/chemical agent mixing chamber.

Preferably the gas treatment chamber includes a chamber outlet operatively associated with the gas/chemical agent mixing chamber and through which a gaseous mixture of gas and chemical agent exits the gas treatment chamber.

Preferably the gas/chemical agent mixing chamber includes a baffle assembly operatively adapted to facilitate evaporation of the chemical agent and to extract airborne chemical agent droplets from the gas/chemical agent mixing chamber.

Preferably the baffle assembly includes strands of chemically inert material.

Alternatively, the baffle assembly includes a perforated plate.

Preferably the pressurised gas supply assembly, includes a pressurised gas source, a gas regulator and a manifold.

Preferably the manifold is a 3-way manifold.

Preferably the atomising assembly includes adjustable sprayers.

Preferably the atomising assembly includes 3 adjustable sprayers.

Preferably the manifold is in fluid communication with the 3 adjustable sprayers with 3 gas conduits of the pressurised gas supply assembly.

Preferably the chemical agent chamber includes a chemical agent outlet.

Preferably the chemical agent outlet includes 3 pickup points.

Preferably the chemical agent supply assembly includes 3 chemical agent conduits operatively adapted to provide fluid communication between the chemical agent outlet and the 3 adjustable sprayers via the 3 chemical agent conduits.

In a second aspect there is disclosed herein a gas treatment method, the gas treatment method including the steps of:

providing a gas treatment chamber, the gas treatment chamber separated into (i) a chemical agent chamber adapted to store a liquid chemical agent, and (ii) a gas/chemical agent mixing chamber in fluid communication with the chemical agent chamber;

providing an atomising assembly operatively associated with the gas/chemical agent mixing chamber;

providing a pressurised gas supply assembly in operative fluid communication with the atomising assembly;

providing a chemical agent supply assembly to provide fluid communication between the chemical agent chamber and the atomising assembly; and atomising liquid chemical agent into a stream of pressurised gas fed from the pressurised gas supply assembly into the gas/chemical mixing agent chamber via the atomising assembly.

In a third aspect there is disclosed herein a spray paint assembly including a spray gun in fluid communication with a gas treatment system in accordance with the first aspect.

BRIEF DESCRIPTION OF THE DRAWINGS

Preferred embodiments of the invention will be described hereinafter, by way of examples only, with reference to the accompanying drawings, wherein:

FIG. 1 is a schematic illustration of a first embodiment gas treatment system; and FIG. 2 is a schematic illustration of a second embodiment gas treatment system.

BRIEF DESCRIPTION OF THE DRAWINGS

FIG. 1 shows a first embodiment gas treatment system, generally indicated with the reference numeral 10, having a gas treatment chamber 12. The gas treatment chamber 12 is separated into (i) a chemical agent chamber 14 adapted to store a liquid chemical agent 16, and (ii) a gas/chemical agent mixing chamber 18 in fluid communication with the chemical agent chamber 14. The gas treatment system 10 further includes an atomising assembly 20, operatively associated with the gas/chemical agent mixing chamber 18, and a pressurised gas supply assembly 22 in operative fluid communication with the atomising assembly 20. The gas treatment system 10 also includes a chemical agent supply assembly 24 to provide fluid communication between the chemical agent chamber 14 and the atomising assembly 20. The atomising assembly 20 is operatively adapted to atomise liquid chemical agent into a stream of pressurised gas, in this embodiment air, fed from the pressurised gas supply assembly 22 into the gas/chemical mixing agent chamber 18.

The embodiment gas treatment chamber 12 comprises a cylinder 26 having a hollow interior 28. The cylinder 26 longitudinally extends about a longitudinal axis 11. In this embodiment the longitudinal axis 11 is operatively horizontally orientated. The cylinder 26 houses a separator 30 adapted to separate the hollow interior 28 into the chemical agent chamber 14 and the gas/chemical agent mixing chamber 18. In this embodiment the separator 30 is provided in the form of a perforated divider panel. As shown, the liquid chemical agent 16 lies at the bottom of the cylinder 26.

The gas treatment chamber 12 includes a filler assembly 32 through which liquid chemical agent can be fed to fill/replenish the chemical agent chamber 14. The gas treatment chamber 12 also includes a chamber inlet 34 operatively associated with the atomising assembly 20. In use pressurised air from the pressurised gas supply assembly 22 and liquid chemical agent from the chemical agent chamber 14 are fed into the gas/chemical agent mixing chamber 18 via the atomising assembly 20. The gas treatment chamber 12 further includes a chamber outlet 36 operatively associated with the gas/chemical agent mixing chamber 18. During use a gaseous mixture of air and chemical agent will exit the gas treatment chamber 12 via the chamber outlet 36. The chamber outlet 36 includes a single outlet opening 38 located towards the operative top of the gas/chemical agent mixing chamber. The effect of this arrangement is that the chemical agent reaches saturation point and exits the gas/chemical agent mixing chamber 18 in a gaseous phase only.

The embodiment gas/chemical agent mixing chamber 18 includes a baffle assembly 40 operatively adapted to facilitate evaporation of the chemical agent and to extract airborne chemical agent droplets from the gas/chemical agent mixing chamber 18. Such extracted chemical agent droplets are fed through the separator 30 back into the chemical agent chamber 14 to undergo another atomising cycle. In this embodiment the baffle assembly 40 includes two baffle sections 42, each baffle section including fine strands of chemically inert material. It will of course be appreciated that the baffle sections 42 can take various forms, for example each baffle section may comprise a non-illustrated perforated plate.

The pressurised gas supply assembly 22 includes a pressurised air source 44 (here a compressor), a regulator 46 and a 3-way manifold 48. The atomising assembly 20, in turn, includes 3 adjustable sprayers 50. The 3-way manifold 48 is in fluid communication with the 3 adjustable sprayers 50 with 3 air conduits 52 of the pressurised gas supply assembly 22.

The chemical agent chamber 14 includes a chemical agent outlet 54 having 3 non-illustrated pickup points in fluid communication with the chemical agent supply assembly 24. In this embodiment the chemical agent supply assembly 24 includes 3 chemical agent conduits 56 for providing fluid communication between the chemical agent outlet 54 and the 3 adjustable sprayers 50 of the atomising assembly 20. In use pressurised air passing through the atomising assembly 20 will cause chemical agent to be drawn from the chemical agent chamber 14 into the atomising assembly to undergo atomisation.

In one particular application the chamber outlet 36 has a non-illustrated hose attached thereto. The hose, in turn, is coupled to a non-illustrated commercially available siphon pot spray gun holding a two-pack polyurethane paint. It would be appreciated that gravity feed or pressure pot delivery systems could also be employed. The chemical agent 16 in this application is a liquid accelerant. When the trigger of the spray gun is opened a gaseous mixture of air and accelerant will atomise the polyurethane and spray it onto a surface/substrate to be coated. The effect of this is that the accelerant is applied at the precise moment the coating is deposited onto the surface/surface. Due to the presence of accelerant in the air, the rate of curing of the polyurethane paint is accelerated without the paint curing prematurely. Also, accelerated curing has been found to reduce the amount of free monomeric isocyanate in the two-pack polyurethane paint. Eliminating or reducing the free monomer content of the polyurethane paint immediately following atomisation renders them less liable to inflict long term chronic effects.

Figure 2:
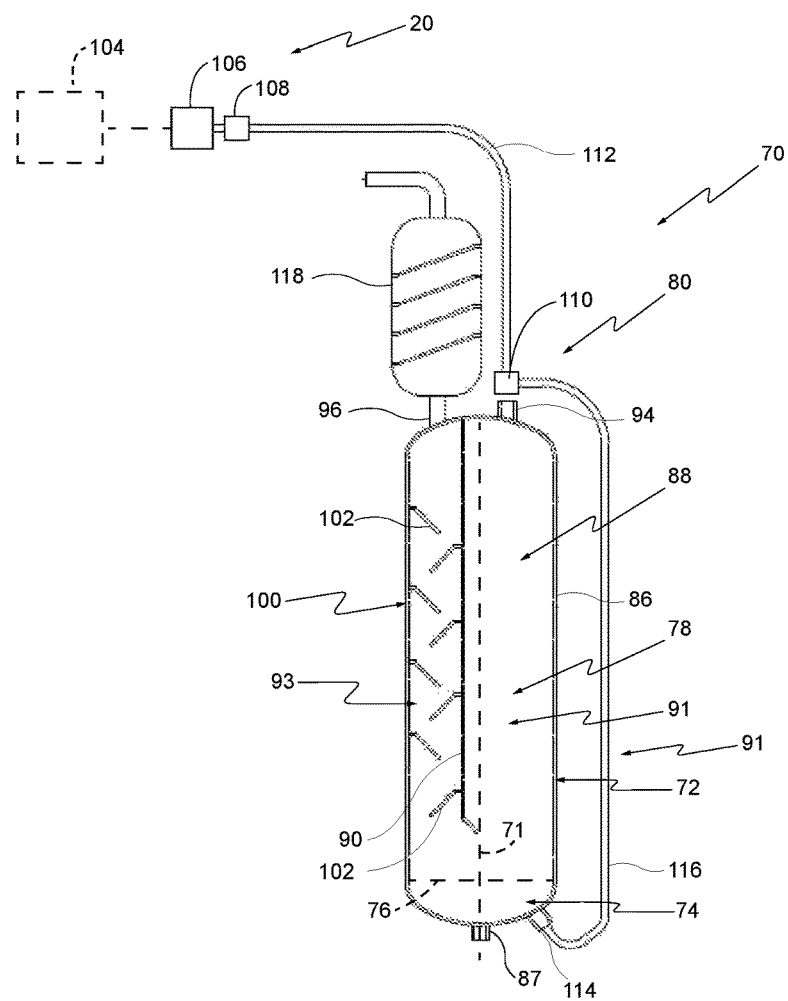

FIG. 2 shows a second embodiment gas treatment system 70. The gas treatment system 70 includes a gas treatment chamber 72. The gas treatment chamber 72 is separated into (i) a chemical agent chamber 74 adapted to store a liquid chemical agent 76, and (ii) a gas/chemical agent mixing chamber 78 in fluid communication with the chemical agent chamber 74. The gas treatment system 70 further includes an atomising assembly 80, operatively associated with the gas/chemical agent mixing chamber 78, and a pressurised gas supply assembly 82 in operative fluid communication with the atomising assembly 80. The gas treatment system 80 also includes a chemical agent supply assembly 84 to provide fluid communication between the chemical agent chamber 74 and the atomising assembly 80. The atomising assembly 80 is operatively adapted to atomise liquid chemical agent into a stream of pressurised gas, in this embodiment air, fed from the pressurised gas supply assembly 82 into the gas/chemical mixing agent chamber 78.

The embodiment gas treatment chamber 72 comprises a cylinder 86 having a hollow interior 88. The cylinder 86 longitudinally extends about a longitudinal axis 71. In this embodiment the longitudinal axis 71 is operatively vertically orientated. The cylinder 86 houses a separator 90 adapted to separate the hollow interior 88 into an inlet section 91 and outlet section 93. In this embodiment the separator 90 is provided in the form of an elongate divider panel. As shown, the liquid chemical agent 76 lies at the bottom of the cylinder 86. The cylinder 86 includes a drain 87 though which chemical agent can be drained from the cylinder 86.

The gas treatment chamber 72 at its top includes a chamber inlet 94 operatively associated with the atomising assembly 80. In use pressurised air from the pressurised gas supply assembly 82 and liquid chemical agent from the chemical agent chamber 74 is fed into the gas/chemical agent mixing chamber 78 via the atomising assembly 80. The gas treatment chamber 72 further includes a chamber outlet 96 at its top operatively associated with the gas/chemical agent mixing chamber 78. During use a gaseous mixture of air and chemical agent will exit the gas treatment chamber 72 via the chamber outlet 96.

The embodiment gas/chemical agent mixing chamber 78 includes a separator assembly 100 operatively adapted to facilitate evaporation of the chemical agent and to extract airborne chemical agent droplets from the gas/chemical agent mixing chamber 78. Such extracted chemical agent droplets will drop under the influence of gravity back to the chemical agent chamber 74 to undergo another atomising cycle. In this embodiment the separator assembly 100 includes a plurality of separator units 102. In this embodiment each separator unit 102 is provided in the form of a perforated plate.

The pressurised gas supply assembly 82 includes a pressurised air source 104 (here a compressor), a regulator 106 and a 3-way manifold 108. The atomising assembly 80, in turn, includes 3 adjustable sprayers 110. The 3-way manifold 108 is in fluid communication with the 3 adjustable sprayers 110 with three air conduits 112 of the pressurised gas supply assembly 82.

The chemical agent chamber 74 includes a chemical agent outlet 114 having three non-illustrated pickup points in fluid communication with the chemical agent supply assembly 84. In this embodiment the chemical agent supply assembly 84 includes three chemical agent conduits 116 for providing fluid communication between the chemical agent outlet 114 and the 3 adjustable sprayers 110 of the atomising assembly 80. In use pressurised air passing through the atomising assembly 80 will cause chemical agent 76 to be drawn from the chemical agent chamber 74 into the atomising assembly to undergo atomisation. In this embodiment pressurised air will enter the chemical agent chamber 74 via the inlet section 91, pass underneath the separator 90, and exit via the outlet section 93 by passing through the separator units 102. Upon exiting the gas treatment chamber 72 air is fed through an accumulator 118 in which any chemical agent which has escaped the gas treatment chamber 72 is captured and prevented from being fed to a downstream non-illustrated spray gun.

Although the invention is described above in relation to preferred embodiments, it will be appreciated by those skilled in the art that it is not limited to those embodiments, but may be embodied in many other forms.

KEY TO REFERENCE NUMERALS

10 Gas treatment system
11 Longitudinal axis
12 Gas treatment chamber
14 Chemical agent chamber
16 Chemical agent
18 Gas/chemical agent mixing chamber
20 Atomising assembly
22 Pressurised gas supply assembly
24 Chemical agent supply assembly
26 Cylinder
28 Interior
30 Separator
32 Filler assembly
34 Chamber inlet
36 Chamber outlet
38 Outlet opening
40 Baffle assembly
42 Baffle sections
44 Air source
46 Regulator
48 Manifold
50 Sprayers
52 Air conduits
54 Chemical agent outlet
56 Chemical agent conduits
70 Second embodiment gas treatment system
71 Longitudinal axis
72 Gas treatment chamber
74 Chemical agent chamber
76 Chemical agent
78 Gas/chemical agent mixing chamber
80 Atomising assembly
82 Pressurised gas supply assembly
84 Chemical agent supply assembly
86 Cylinder
87 Drain
88 Interior
90 Separator
91 Inlet section
93 Outlet section
94 Chamber inlet
96 Chamber outlet
100 Separator assembly
102 Separator units
104 Pressurised air source
106 Regulator
108 Manifold
110 Adjustable sprayers
112 Air conduits
114 Chemical agent outlet
116 Chemical agent conduits

The invention claimed is:

1. A gas treatment system including:
a gas treatment chamber, the gas treatment chamber separated into (i) a chemical agent chamber adapted to store a liquid chemical agent, and (ii) a gas/chemical agent mixing chamber in fluid communication with the chemical agent chamber;
an atomising assembly operatively associated with the gas/chemical agent mixing chamber;
a pressurised gas supply assembly in operative fluid communication with the atomising assembly; and
a chemical agent supply assembly to provide fluid communication between the chemical agent chamber and the atomising assembly,
wherein the atomising assembly is operatively adapted to atomise liquid chemical agent into a stream of pressurised gas fed from the pressurised gas supply assembly into the gas/chemical mixing agent chamber,
wherein the gas treatment chamber comprises a cylinder having a hollow interior, and
wherein the cylinder houses a separator adapted to separate the hollow interior into the chemical agent chamber and the gas/chemical agent mixing chamber.

2. A gas treatment system according to claim 1, wherein the gas is air.

3. A gas treatment system according to claim 1, wherein the gas treatment chamber includes a filler assembly through which liquid chemical agent is fed to the chemical agent chamber.

4. A gas treatment system according to claim 3, wherein the gas treatment chamber includes a chamber inlet operatively associated with the atomising assembly, in use pressurised gas from the pressurised gas supply assembly and liquid chemical agent from the chemical agent chamber being fed into the gas/chemical agent mixing chamber.

5. A gas treatment system according to claim 4, wherein the gas treatment chamber includes a chamber outlet operatively associated with the gas/chemical agent mixing chamber and through which a gaseous mixture of gas and chemical agent exits the gas treatment chamber.

6. A gas treatment system according to claim 5, wherein the gas/chemical agent mixing chamber includes a baffle assembly operatively adapted to facilitate evaporation of the chemical agent and to extract airborne chemical agent droplets from the gas/chemical agent mixing chamber.

7. A gas treatment system according to claim 6, wherein the baffle assembly includes strands of chemically inert material.

8. A gas treatment system according to claim 6, wherein the baffle assembly includes a perforated plate.

9. A gas treatment system according to claim 1, wherein the pressurised gas supply assembly, includes a pressurised gas source, a gas regulator and a manifold.

10. A gas treatment system according to claim 1, wherein the chemical agent chamber includes a chemical agent outlet.

11. A gas treatment system according to claim 10, wherein the chemical agent outlet includes 3 pickup points.

12. A spray paint assembly including a spray gun in fluid communication with a gas treatment system according to claim 1.

13. A gas treatment system including:
a gas treatment chamber, the gas treatment chamber separated into (i) a chemical agent chamber adapted to store a liquid chemical agent, and (ii) a gas/chemical agent mixing chamber in fluid communication with the chemical agent chamber;
an atomising assembly operatively associated with the gas/chemical agent mixing chamber;
a pressurised gas supply assembly in operative fluid communication with the atomising assembly; and a chemical agent supply assembly to provide fluid communication between the chemical agent chamber and the atomising assembly, wherein the atomising assembly is operatively adapted to atomise liquid chemical agent into a stream of pressurised gas fed from the pressurised gas supply assembly into the gas/chemical mixing agent chamber, wherein the pressurised gas supply assembly, includes a pressurised gas source, a gas regulator and a manifold, and wherein the manifold is a 3-way manifold.

14. A gas treatment system including:

a gas treatment chamber, the gas treatment chamber separated into (i) a chemical agent chamber adapted to store a liquid chemical agent, and (ii) a gas/chemical agent mixing chamber in fluid communication with the chemical agent chamber;

an atomising assembly operatively associated with the gas/chemical agent mixing chamber;

a pressurised gas supply assembly in operative fluid communication with the atomising assembly; and a chemical agent supply assembly to provide fluid communication between the chemical agent chamber and the atomising assembly, wherein the atomising assembly is operatively adapted to atomise liquid chemical agent into a stream of pressurised gas fed from the pressurised gas supply assembly into the gas/chemical mixing agent chamber, wherein the pressurised gas supply assembly, includes a pressurised gas source, a gas regulator and a manifold, and wherein the atomising assembly includes adjustable sprayers.

15. A gas treatment system according to claim 14, wherein the atomising assembly includes 3 adjustable sprayers.

16. A gas treatment system according to claim 15, wherein the manifold is in fluid communication with the 3 adjustable sprayers with 3 gas conduits of the pressurised gas supply assembly.

17. A gas treatment system according to claim 16, wherein the chemical agent supply assembly includes 3 chemical agent conduits operatively adapted to provide fluid communication between the chemical agent outlet and the 3 adjustable sprayers via the 3 chemical agent conduits.

18. A gas treatment method including the steps of:

providing a gas treatment chamber, the gas treatment chamber separated into (i) a chemical agent chamber adapted to store a liquid chemical agent, and (ii) a gas/chemical agent mixing chamber in fluid communication with the chemical agent chamber with the gas treatment chamber including a cylinder having a hollow interior;

providing an atomising assembly operatively associated with the gas/chemical agent mixing chamber with the gas treatment chamber cylinder housing a separator adapted to separate the hollow interior into the chemical agent chamber and the gas/chemical agent mixing chamber;

providing a pressurised gas supply assembly in operative fluid communication with the atomising assembly;

providing a chemical agent supply assembly to provide fluid communication between the chemical agent chamber and the atomising assembly; and atomising liquid chemical agent into a stream of pressurised gas fed from the pressurised gas supply assembly into the gas/chemical mixing agent chamber via the atomising assembly.

\* \* \* \* \*